United States Patent [19]
Pruvot et al.

[11] 3,724,618
[45] Apr. 3, 1973

[54] TRANSMISSION MECHANISMS WITH HYDROSTATIC COUPLING

[75] Inventors: Francois C. Pruvot; Jean-Claude Carre, both of Billancourt, France

[73] Assignees: Regie Nationale Des Usines Renault, Billancourt; Automobiles Peugeot, Paris, both of France

[22] Filed: May 10, 1971

[21] Appl. No.: 141,631

[52] U.S. Cl. ....................192/.07, 192/.075, 60/19
[51] Int. Cl. ..............................................F16d 31/02
[58] Field of Search...60/19, 53 A; 74/731, 865, 867, 74/868; 192/3.57, .07, .075, .076, .03

[56] References Cited

UNITED STATES PATENTS 2,025,472  12/1935  Perry..................................192/.07 X
3,237,734  3/1966  Jania..................................192/.032

Primary Examiner—Edgar W. Geoghegan
Attorney—Stevens, Davis, Miller & Mosher

[57] ABSTRACT

This mechanism for transmitting a torque to a hydrostatic coupling of the barrel-cylinder type is characterized in that each piston of the barrel-type cylinder block is hollow and incorporates a delivery valve and that its cylinder is supplied with pressure fluid through a non-return valve; furthermore, the inner cavity of each piston is constantly connected to a chamber formed in the cylinder block and centered to the axis of rotation of this block. A valve member is movable under the control of the fluid contained in said chamber against the force of a central piston having one side responsive to an adjustment pressure. A forced-feed pressure is exerted through said non-return valve for constantly pressing the cylinder-block pistons against the corresponding swash plate.

15 Claims, 7 Drawing Figures

TRANSMISSION MECHANISMS WITH HYDROSTATIC COUPLING

The present invention relates in general to mechanisms of the type designed for operatively connecting or disconnecting two generally coaxial rotary shafts.

More particularly, this invention is concerned with a mechanism adapted to couple a rotating shaft to a stationary shaft, and thus cause this initially stationary shaft to revolve in synchronism according to a well-defined law, adapted to be modified at will by variation, whether of speed or torque, as a function of time.

The present invention is also concerned with a clutch or coupling for automotive or motor vehicles, which is adapted rotatably to disengage the crankshaft of an internal combustion engine from the primary shaft of the change-speed mechanism or gearbox, when changing gears and when the vehicle is still, and to transmit the engine torque for properly starting the vehicle and ensuring the normal running thereof.

Mechanically-controlled friction disk clutches are well known in the art. These devices permit the gradual starting of the vehicle when the driver also actuates the engine acceleration control device.

However, the necessity of learning to drive under specific conditions, and the physical and nervous strain when driving in heavy town traffic, constitute far from negligible drawbacks of these devices.

Furthermore, it is rather difficult to adapt these devices to automatic and semi-automatic transmission mechanisms.

Known attempts at reducing or eliminating these drawbacks comprised the use of clutches controlled through electromagnetic or pneumatic means. Although these clutches simplified the drive, their use was not widespread on account of their insufficient progressiveness and their relatively high cost.

The use of hydrokinetic couplings disposed between the engine and the change-speed transmission is also known in the art.

To operate properly these couplings must be surrounded by air. Therefore, they are attended by difficult fluid-tightness problems. Besides, their considerable volume leads to difficult lay-out problems. Moreover, it is known by those conversant with the art that the performances of vehicles equipped with these couplings are lower than those of vehicles equipped with conventional friction clutches. Another inconvenience arising from the use of hydrokinetic couplings is a certain amount of slip and the residual drag under idling conditions (the disengagement is not complete), so that in many cases the use of an additional reverse clutch is required.

Finally, hydrostatic coupling or clutch transmissions are also known wherein the engine crankshaft is connected to the input shaft of a hydraulic pump having its casing rigid with the primary shaft of the change-speed mechanism or gearbox. Thus, when the pump output is free, the pump shaft or the engine crankshaft can also revolve freely.

On the other hand, if the pump output is gradually throttled the pressure of the fluid delivered by the pump increases and a torque depending on the fluid pressure will be necessary for driving the pump shaft. The same torque will be transmitted through the pump casing to the primary shaft of the transmission mechanism. To obtain a slipless coupling it is only necessary, at least theoretically, to close the pump delivery or outlet orifice and to select a pump type producing relatively low internal leakage in order to minimize slip.

However, up to now the commercial manufacture or mass production of couplings of this type has not been possible due to the technological defects of the pumps associated therewith and also to the high pressures involved (of the order of 5,800 to 7,250 psi), which set technical problems very difficult to solve in the present state of the art.

In view of the foregoing, it is the essential object of the present invention to provide a high-pressure hydrostatic clutch or coupling wherein the fluid high pressure is exerted only on the rotary unit, thus avoiding any high-pressure duct, pipings and unions.

This invention is also concerned with a coupling in which the residual torque in the disengaged position is negligible.

Furthermore, this invention is concerned with a power unit wherein the torque transmitted through the clutch is adjustable as desired by means of one or a plurality of external parameters.

It is another object of this invention to maintain at a constant value the predetermined speed of the internal combustion engine during the clutch engaging operation.

In addition, another object of this invention consists in providing a coupling utilizing the gearbox oil as an operating fluid.

The mechanism according to this invention, which is intended for transmitting a torque from a power or driving shaft to a driven shaft and comprises a hydrostatic coupling having its input members rigid with the driving shaft and the output members rigid with the driven shaft, said input members comprising an impeller or swash plate imparting a reciprocating motion to a plurality of pistons slidably mounted in bores formed in a barrel-type cylinder-block, said cylinder-block and piston assembly further comprising fluid delivery valves and means for throttling the fluid output resulting from the relative movement of the input and output members of the hydrostatic coupling, is characterized by the following combination of elements:

a. Each piston is hollow and comprises a delivery or discharge valve responsive to the action exerted by the pressure of the fluid contained in a first chamber between the piston and the cylinder bottom, said piston being separated from a second fluid supply chamber by a non-return valve permitting the filling of this second chamber;

b. The hollow interior of each piston is constantly connected to a third chamber formed in the cylinder-block and centered to its axis of rotation;

c. A movable valve member is responsive to the action of the fluid contained in said third chamber against the force of a piston having one face responsive to an adjustment pressure;

d. A forced-feed pressure is exerted through said non-return valve for constantly urging said pistons against said swash or impeller plate.

Other features and advantages of this invention will appear as the following description proceeds with reference to the attached drawings, in which.

Figure 1:
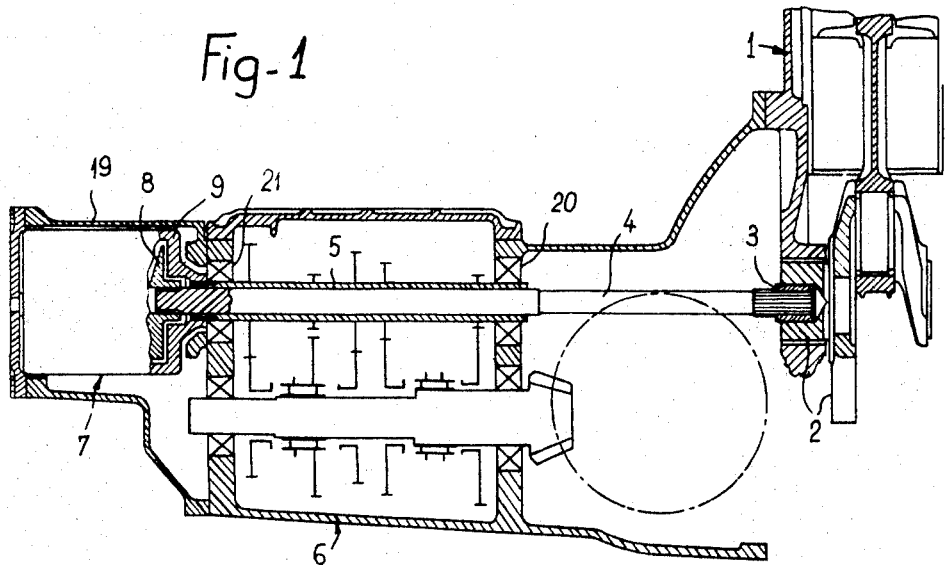
FIG. 1 is a diagrammatic and fragmentary longitudinal section of the power unit and transmission mechanism.
Figures 3, 4:
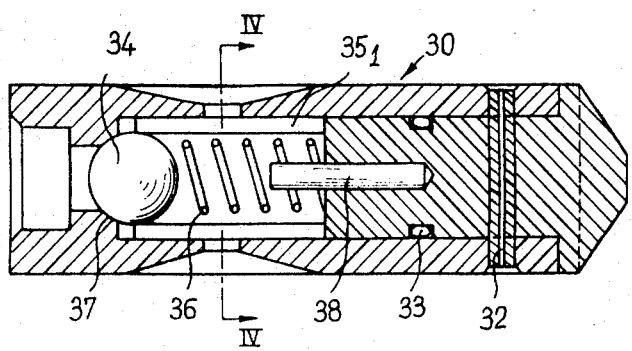
FIG. 3 is an axial section showing on a still larger scale a single piston of said coupling.
FIG. 4 is a detail view showing the same piston in cross-section taken along the line IV—IV of FIG. 3.

The assembly illustrated in FIG. 1 comprises an internal combustion engine 1 having its crankshaft 2 connected through a ring 3 formed with internal and external splines to a torsion shaft 4 having splined ends. This shaft 4 drives the primary shaft 5 of the change-speed transmission mechanism or gearbox 6 via a hydrostatic coupling shown only in substantially block form in FIG. 1.

Figure 2:
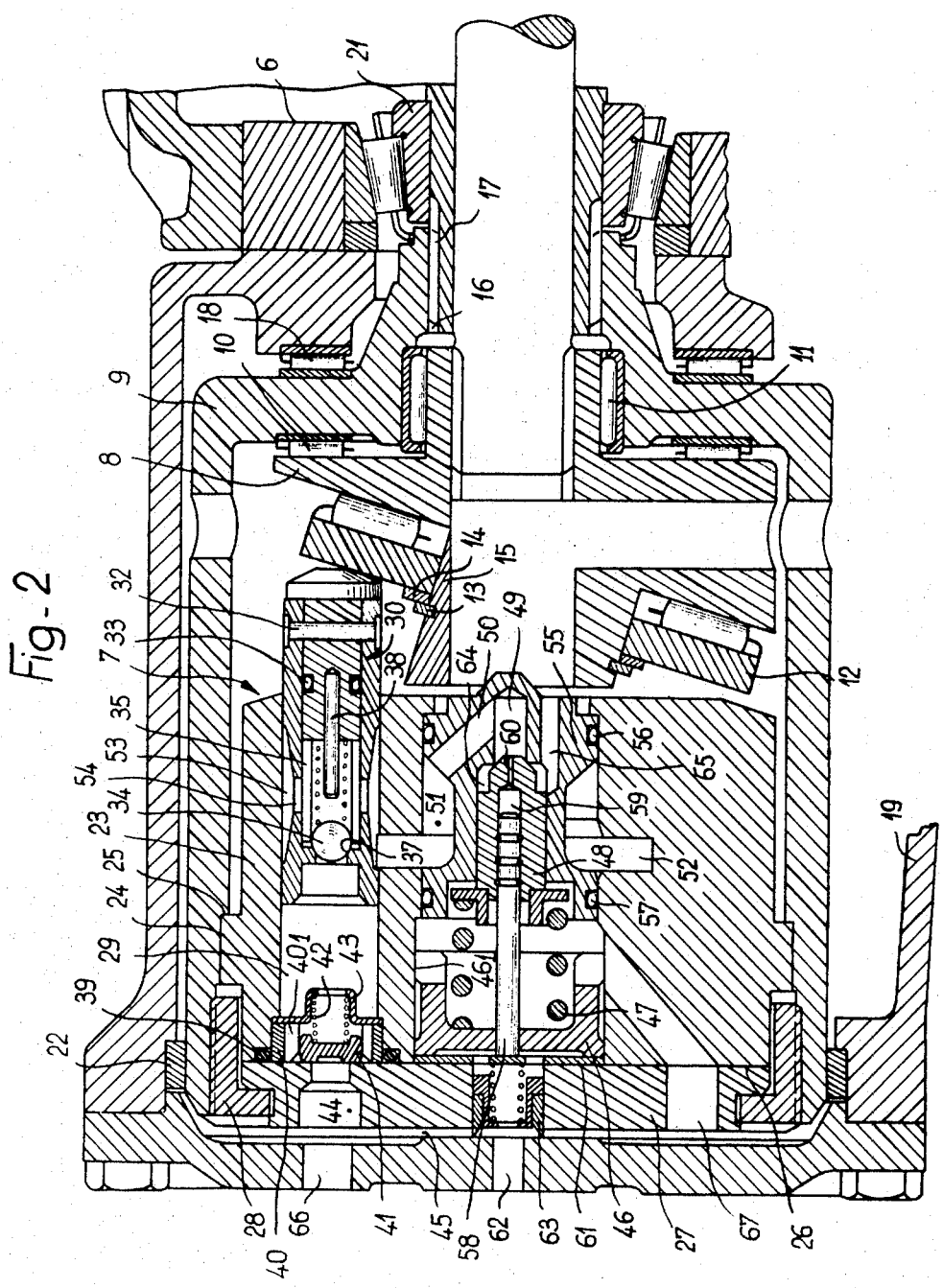
FIG. 2 is an axial section showing on a larger scale the coupling incorporated in the transmission mechanism.

The shaft 4 extends coaxially through the hollow primary shaft 5 without driving same, and drives an impeller or swash plate 8 revolving within the body of the casing 9 of coupling 7. The swash plate 8 (FIG. 2) bears through a thrust needle bearing 10 against the casing 9 and is centered by a needle bearing 11 in said casing 9. A roller thrust bearing 12 engages the other or inner face of swash plate 8. This roller thrust bearing 12 is centered and retained on swash plate 8 by means of device illustrated in FIG. 2 as comprising a circlip 13 and a thrust washer 14 centered on the hub 15 of bearing 12.

The body 9 is rotatably connected through splines 16 to the correspondingly splined end portion 17 of the primary shaft 5 of the change speed mechanism 6. This primary shaft 5 is journalled in a pair of bearings illustrated herein in the form of taper-roller bearings 20 and 21.

A needle thrust bearing 18 disposed between the casing 9 and the outer case 19 of the coupling is adapted to absorb the axial stresses exerted on the casing 9. It will be noted that the use of a needle thrust bearing 18 is required only in case the change-speed bearing 20 is unable to withstand the stress transmitted through the casing 9. If the dimensions of this bearing 20 are sufficient to absorb the axial efforts produced during the operation of this mechanism, it is only necessary that the casing 9 bears against the inner race of bearing 21.

The casing 9 is centered at its other end by means of a ring 22 also acting as a seal or packing, as will be explained presently. This ring 22 consisting of anti-friction material is mounted in a fixed position in the case 19 of coupling 7, this case being secured in any suitable manner (not shown) to the gearbox case 6.

Mounted in the casing 9 is a pump cylinder-block or barrel 23. This barrel 23 is centered through its outer diameter 24 in the casing 9 and bears against a shoulder 25 of said casing, Suitable pins or studs (not shown) are provided for preventing any relative rotation between barrel 23 and casing 9.

The flat or slide-face 26 of the cylinder barrel engages a registering face of a cover 27. This cover 27 is secured by means of a nut 28 engaging a corresponding tapped portion of casing 9. This nut 28 presses the cover 27 against the barrel 23 and the barrel 23 against the shoulder 25 of casing 9.

When fitted in position the assembly comprising said members 23, 9, 27 and 28, may be considered as a single unit or body.

A number of bores or cylinders 29 are formed through the barrel 23 and terminate at both faces thereof. As a rule, an odd number of such bores 29 are provided. Each bore is slidably engaged by a hollow piston 30 consisting of two parts. These two piston elements are assembled by means of a diametral pin 32 and a packing ring 33 is inserted therebetween to prevent any leakages to the outside. A ball 34 acting as a delivery valve is guided with a certain clearance in the piston by means of a bore 35 formed with longitudinal slots $35_1$ to permit the flow of oil therealong. A spring 36 constantly urges the ball 34 for sealing engagement with its seat 37.

The permissible axial excursion of ball 34 is limited by an axial stud 38. The outer end of the piston has a frusto-conical configuration and engages the registering face of roller thrust bearing 12.

Each bore 29 of barrel 23 provides a first chamber between the hollow piston 30 and the cylinder bottom and has formed therein on the side of cover 27 a stepped recess having a greater diameter than piston 30. This recess is adapted to receive a seal 39 for preventing oil leakages from the cylinder 29 to the exterior, and a ring 40 is provided to constitute a guiding cage to another flat movable valve member 41 constituting a non-return valve constantly urged against its seat, consisting of the registering flat face of cover 27, by a spring 42. This spring 42 reacts against a spring retainer 43 held in said recess by ring 40. This ring 40 is also adapted to center the aforesaid valve member 41 with a reduced play and comprises splines $40_1$ to permit the passage of fluid sucked by the piston 30.

Orifices 44 are formed through the cover 26 to provide a fluid connection between the valves 41 and a second fluid supply chamber 45 located ahead of the coupling casing, between said cover 27 and the adjacent cover closing the end of casing 19.

In a bore $46_1$ formed coaxially in the barrel 43 a control piston 46 is slidably fitted; this piston 46 reacts through a resilient member such as a spring 47 against a valve 48. This valve 48 closes a port 49 connected via a passage 50 to a third annular chamber 51 constantly connected in turn via a circular groove 52 to the inner cavity of each piston 30 through an annular chamber 53 and orifices 54 formed in each piston. The valve 48 is guided in a cage 55 centered in said central bore $46_1$ of barrel 23. The cage 55 is formed with a throttled portion limiting said annular chamber 51. This annular chamber 51 is isolated by a pair of packings 56 and 57.

Moreover, the valve member 48 has fitted in an axial bore thereof a fixed rod 58 forming therewith a chamber 59 communicating via an orifice 60 with the aforesaid port 49.

The aforesaid fixed rod 58 extends on the other hand through the control piston 46 and bears against a washer 61 formed with perforations permitting the communication between the face of piston 46 and an orifice 62 in which the adjustment pressure is exerted via a rotary seal 63.

A chamber 64 formed between said valve member 48 and cage 55 communicates through holes 65 with the inner space of casing 9. The end chamber 45 is supplied with fluid through a port 66.

The above-described coupling operates as follows :

The shaft 4 is driven from the internal combustion engine 1 and causes the cam-forming swash plate 8 to revolve.

1. The vehicle is at a standstill :

When a gear ratio is engaged, the primary shaft 5 of the transmission mechanism is inoperative as well as the casing 9 of coupling 7 and the parts rigid therewith.

If under these conditions the pistons were held in engagement with the thrust bearing 12 they would be reciprocated.

In fact, the pistons 30 engage the bearing 12 with force only when the fluid delivered via orifice 66 into chamber 45 is at a pressure sufficient to unseat the valves 41 and penetrate into cylinders 29.

Moreover, the pistons 30 are urged against the thrust bearing 12 even if the fluid pressure unseats the balls 34, for the valve 48 can as well close the orifice 49 and thus prevent the escape of fluid.

To produce a clutch disengagement really free of any residual drag or driving torque, between the input shaft 4 and the primary shaft 5 of the change-speed mechanism, it is only necessary to zero the fluid pressure in chamber 45. Then the swash or cam plate 8 drives the pistons 30 back into their bores. Since these pistons cannot move back, any torque between shafts 4 and 5 will be cancelled.

If the fluid pressure is restored in chamber 45, it will be seen that the fluid will flow into cylinders 29 via valves 41, so that pistons 30 will move to the right as seen in FIG. 1. However, the fluid cannot flow out through this valve which is of the non-return type, when the piston is moved in the opposite direction, so that the fluid in cylinder 29 will move the ball 34 away from its seat 37 and flow into the annular chamber 51 via slots 35₁, orifices 54, chamber 53 and groove 52. From the annular chamber 51 the fluid is directed via passages 50 into port 49 from which it cannot escape unless the valve 48 is unseated, and when this is done the fluid will flow into chamber 64, through perforations 65 and into the coupling case 19. To unseat the valve 48 the fluid must exert thereon a force depending on that exerted on this valve by the piston 46 and spring 47, and this force will depend in turn on the pressure available at port 62.

Thus, according to the value of the force exerted through port 62 to the pressure built up in each cylinder 29 will vary more or less. Under these conditions, the torque transmitted through the coupling may be modulated in proportion to the control pressure.

It will be noted that the assembly comprising the rod 58 and valve 48 operates somewhat like a differential piston and reduces the effort necessary for counteracting the force tending to unseat the valve 48, for this force corresponds to the product of the fluid pressure by the difference between the cross-sectional areas of orifice 49 and rod 48.

Furthermore, the annular bearing 22 also separates the chamber 45, in which the forced-feed pressure is exerted, from the case 19 of the change-speed transmission or gearbox. Since this forced-feed pressure is relatively moderate, it is unnecessary to use more sophisticated sealing means.

It will also be seen that the port 67 formed in the cover 27 connects the face of piston 46 opposite to that receiving the pressure prevailing in port 62, to chamber 45. The function of port 67 will be explained presently.

Finally, it is clear that the crankshaft 2 of the internal combustion engine has no flywheel. Since the inertia of the hydrostatic coupling is considerably lower than that of a conventional clutch, any risk of producing undesired vibration of the crankshaft between the flywheel and the clutch is safely avoided and therefore the flywheel can be mounted on the opposite or free end of the crankshaft (not shown).

The coupling must meet the following operating conditions :

Let us consider the vehicle at a standstill, with the engine idling :

a. One gear is engaged : the coupling is disengaged.
b. No gear is engaged : the coupling is in neutral.
Starting period :

The torque transmitted to the primary shaft of the change-speed mechanism must permit the constant-speed engine operation during the clutch engaging period and the engine speed must be subordinate to the degree of depression of the accelerator pedal.

Figure 5:
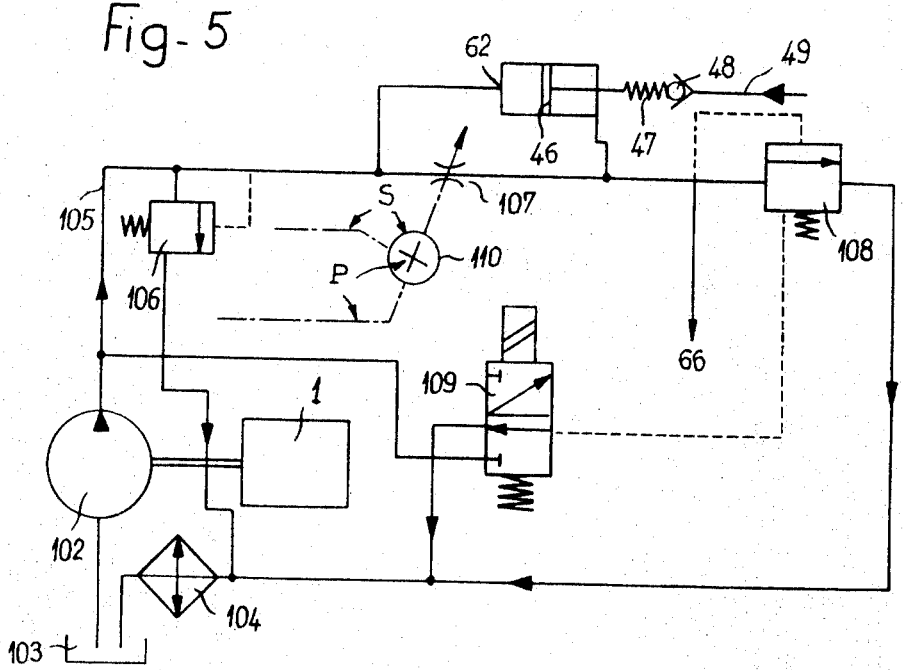
FIG. 5 is a diagram showing the hydraulic control circuit of the coupling.

According to FIG. 5 illustrating the coupling control circuit a constant volumetric capacity pump 102 driven from the engine 1 draws oil from a reservoir 103 and delivers same to a pipe line 105. A safety valve or other pressure limiting device 106 limits the fluid pressure in line 105. The aforesaid pump 102 delivering the forced feed pressure to the coupling has a cylinder capacity slightly superior to that of the coupling pump proper. The reservoir 103 may consist of the oil sump of the internal combustion engine 1, or the case 6 of the change-speed mechanism. The heat exchanger 104 may consist simply of the oil sump provided with adequate cooling fins.

In parallel to valve 106 said pipe line 105 is connected to the inlet port 62 of the chamber limited by the piston 46. The gauged pressure of safety valve 106 will be selected to such a value that the maximum pressure applicable to piston 46 cannot increase the pressure in orifice 49 to a value greater than the maximum pressure which the hydrostatic coupling pump can withstand.

Under these conditions it will be seen that the torque transmitted by the coupling will be proportional to the pressure generated by pump 102.

In parallel to valve 106 and piston 46, the pump 102 will also deliver pressure fluid to a throttling valve 107 of which the cross-sectional passage area is controlled directly by the accelerator control of the vehicule (as shown diagrammatically at P).

The pressure downstream of the passage of this throttling valve will be forced-feed pressure applied to the coupling. This last-named pressure is set by a pressure limiting device 108 to a value sufficient to cause the pump pistons 30 to bear against the thrust bearing 12 throughout the speed range of the internal combustion engine.

A solenoid-operated valve 109 is adapted, when energized, to reduce said forced-feed pressure to zero. This valve 109 is furthermore responsive to the carburettor starter or choke (as shown diagrammatically at S).

This arrangement operates as follows:

Assuming that the vehicle is at a standstill with the engine running at idling speed; when the driver grips the change-speed control lever for engaging the low speed, the aforesaid electric switch, of a type known per se, is closed to energize the solenoid-operated valve 109, thus opening the pressure limiting device 108. Therefore, the forced-feed pressure is reduced to zero and the "clutch" disengagement is obtained. Immediately as the driver's hand releases the change-speed control lever the aforesaid electric switch is re-opened, the solenoid valve 109 de-energized and the forced-feed pressure restored, thus permitting the transmission of a very small engine torque to the transmission mechanism. If the engine is not accelerated, the cross-sectional passage area of throttling valve 107 controlled directly through the accelerator pedal is such that the pressure drop in valve 107 as a consequence of the output of pump 102 is very small. The differential pressure exerted against piston 46 as well as the gauging of valve 48 are then extremely low and a torque of nearly zero value is transmitted through the hydrostatic coupling.

Now if the driver actuates the choke or carburettor starter, and consequently the member 110 (a simple linkage and lever system) the throttling valve 107 is opened to a slightly greater degree and the same pressure values as under idling conditions are obtained. This is necessary to prevent the vehicle from being started from rest when the choke or starter is actuated.

Now if the engine is accelerated, each accelerator position will correspond to a different cross-sectional passage area of throttling valve 107.

Figure 7:
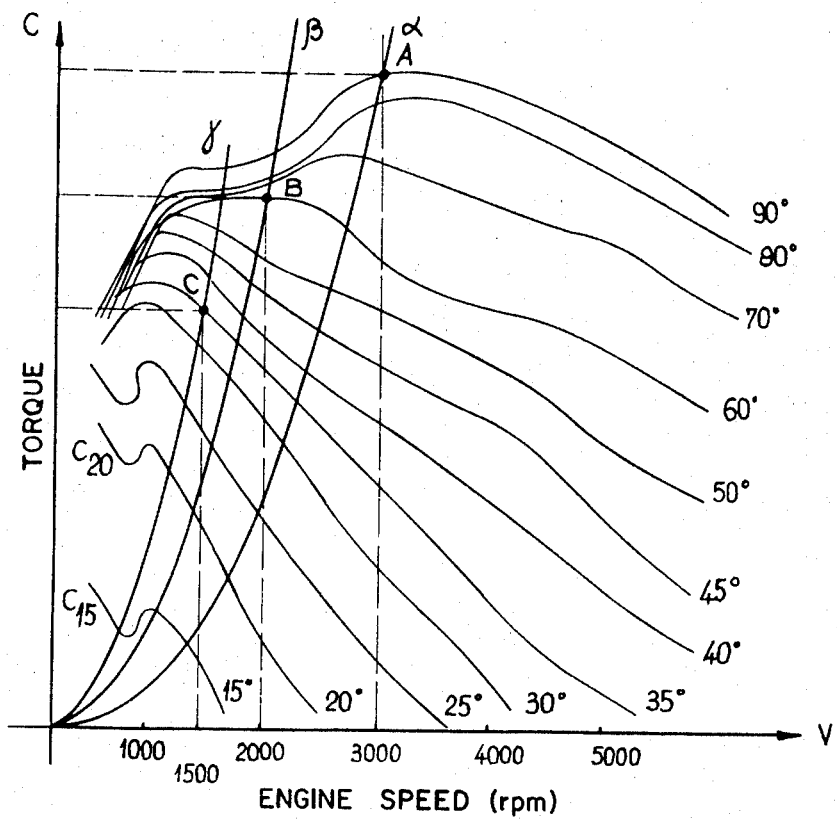
FIG. 7 is a diagram showing the mode of operation of the coupling, in which the engine speed V in r.p.m. is plotted in abscissa against the torque C in ordinates.

The pressure drop through throttling valve 107, for a given opening of this valve as a function of the engine speed, adheres to a parabolic law, as well known in the art and shown in FIG. 7. Moreover, since the throttling valve 107 is of the thin-walled type the pressure varies but very little as a function of the fluid viscosity (curves $\alpha$, $\beta$ and $\gamma$). On the other hand, for any given angular opening of the carburettor throttle there is an engine torque curve as a function of the engine r.p.m. value, such as C15, C20, etc... (curves given for 15° and 20° of carburettor butterfly valve opening). Moreover, to each angular opening position of the carburettor butterfly valve there corresponds a cross-sectional passage area of the throttling valve 107, and therefore a curve such as $\alpha$, $\beta$ or $\gamma$, since it is known that the torque transmitted by the coupling is proportional to the differential pressure obtaining through the throttling valve 107 and that the pressure itself is a parabolic function of the internal-combustion engine speed.

In this figure it will be seen that if the accelerator pedal is depressed home, the butterfly valve is wide open and the torque curve of the i.e. engine is curve C 90°. Similarly, the curve of the torque transmitted when the valve 107 is in its fully open position is curve $\alpha$. The working point will be point A. It will also be seen that the engine speed will remain at 3,000 r.p.m. as long as the clutch engagement is not complete. In fact, pump 102 is driven from the engine and the pressure generated by this pump depends only on the engine speed and on the cross-sectional passage area of valve 107.

The pressure generated by pump 102 is therefore independent of the relative speed of the vehicle and of the speed of the primary shaft of its transmission or change-speed mechanism.

Now if it is desired to prevent the clutch from slipping each time a gear change is made it is only necessary, when any gear except the low or first gear is engaged, to reset the throttling valve 107 to the idling position. Then, its only function will be to prevent the engine from stalling in case the driver allowed its r.p.m. value to drop to a value abnormally low for the specific gear engaged. The safety valve 106 will then limit the operating pressure of pump 102.

Under these conditions it is clear that at each gear change the clutch re-engagement is likely to be rather sudden. To avoid this the spring 47 of valve 48 will prevent the engine torque from rising to excessively high values in the transitory engine speeds by eliminating the over-torques due to inertia forces.

The spring 47 should be such that the gauging pressure of valve 106, which is exerted on piston 46, will restore this piston in its abutting position and permit the opening of port 49 when the transmitted torque exceeds 10 to 20 percent of the maximum engine torque.

On the other hand, it is known that valves such as 48 have a very steep pressure vs. output characteristic curve (the pressure of the fluid flowing through valve 48 varying mainly as a function of the fluid output). In contrast to conventional practice, this property constitutes a positive factor as far as the progressiveness of the clutch in the arrangement according to the present invention is concerned.

To reduce the losses of energy in the pump at high speeds it is advantageous to use a variable-capacity pump (acting as a tachometric, constant-capacity pump as long as it operates below its gauged pressure, this pump being set at the minimum capacity sufficient for maintaining the forced-feed pressure after the starting period). In fact, when the coupling is in its engaged position the forced-feed output is no more necessary, and only the forced-feed pressure is to be maintained.

Figure 6:
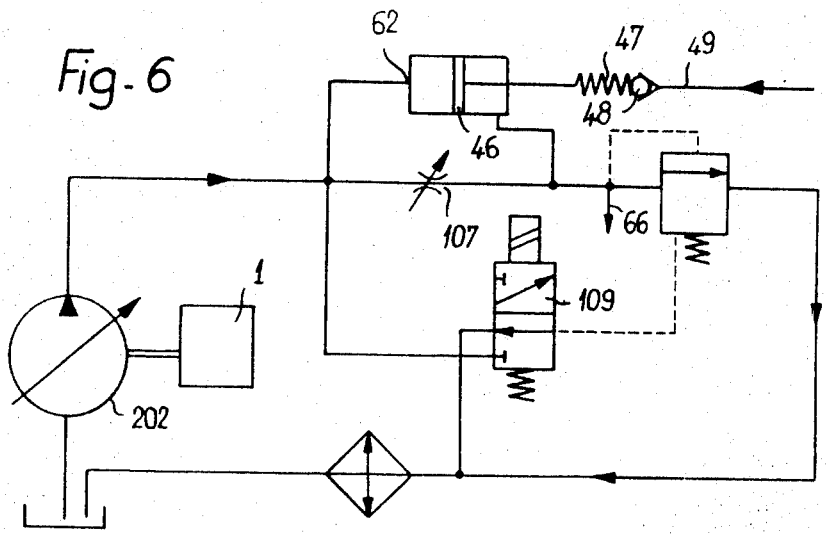
FIG. 6 is a modified form of embodiment of the hydraulic control circuit.

The arrangement illustrated in FIG. 6 constitutes a modification of that illustrated in FIG. 5. In the assembly shown in FIG. 6 the variable-capacity pump 202 has a maximum volumetric capacity slightly greater than that of the coupling pump. When the pump has attained its forced-feed pressure value its cylinder capacity can decrease until it delivers the output just necessary for maintaining the forced-feed pressure. The control means associated with this pump, as in the case of all the other component elements of the arrangements of FIGS. 5 and 6, are of a current or conventional commercial type.

With this pump it will be seen that the safety valve 106 contemplated in FIG. 5 may be dispensed with.

It will be seen that the invention should not be construed as being strictly limited, in the form of embodiment of FIG. 1, to the control of change-speed transmission mechanism of the dog and sliding gear type.

The pump 202 may also be used for supplying the pressure necessary for clamping the brakes or clutches of an automatic gearbox of the epicyclic type. Since in a gearbox of this type the gear changes take place under load, the hydrostatic coupling would then be used only for starting the vehicle from rest.

The wide range of commercial application possibilities adapted to be made from the basic principle of the present invention will be readily inferred from the foregoing. This coupling may be used in all motor vehicles, notably those normally operated with very frequent starts and stops.

Thus, a typical application of this invention relates to refuse collection vehicles wherein the engine must deliver power for operating devices other than the transmission, this application precluding of course the use of torque converters due to their residual drag and poor efficiency.

Moreover, it will be noted that many component elements of this coupling can be manufactured economically on a large scale. More particularly, the barrel, the suction valves and their guide means may be made of sintered metals, and the other parts are either turned or cast from malleable cast-iron (casing 9), or cold-forged.

Of course, various modifications may be brought to the constructional details and relative arrangement of parts of the transmission mechanism of which only a specific and preferred form of embodiment is decribed and illustrated herein, without however departing from the basic principles of the invention as set forth in the appended claims. Thus, more particularly, the hydraulic circuits illustrated in FIGS. 5 and 6 may be used for controlling a friction clutch wherein the disks clamping force is exerted through a control piston such as the piston 46 of the above-described coupling. In this case, the cylinder in which this piston is slidably mounted would be supplied with fluid through pipe line 105. With this arrangement, the clutch control pedal may be dispensed with.

What is claimed as new is:

1. Mechanism for transmitting a torque from a driving shaft to a driven shaft, which comprises a hydrostatic coupling of which input members are rigid with said driven shaft, and of which output members are rigid with said driven shaft, said input members comprising a swash plate adapted to impart a reciprocating motion to pistons slidably mounted in bores formed in a barrel-type cylinder block, said cylinder block and pistons being furthermore provided with fluid dispensing valves and means for throttling the fluid output generated by the relative movement of the input and output members of said hydrostatic coupling, characterized in that it comprises the combination of a plurality of elements, i.e.
   a. each piston is hollow and comprises a delivery valve responsive to the action of the pressure exerted by a fluid enclosed in a first chamber between the piston and the cylinder bottom, said first chamber being isolated in turn from a second chamber for supplying hydraulic fluid via a non-return valve to permit the filling of said first chamber,
   b. the inner cavity of each hollow piston is connected permanently to a third chamber provided in the cylinder block and centered to its axis of rotation,
   c. a valve responsive to the action of the fluid contained in said third chamber against the force of a piston having one side responsive to an adjustment pressure,
   d. a feed pressure is exerted through said non-return valve for constantly urging said cylinder-block pistons against said swash plate.

2. Mechanism according to claim 1, characterized in that said valve responsive to the action of fluid contained in said third chamber is of the differential type and formed with an orifice connecting one portion of said third chamber forming valve seat to an axial bore bounded by a fixed rod having a smaller cross-sectional area than said valve seat.

3. Mechanism according to claim 2, characterized in that said piston responsive on one side to an adjustment pressure is located in said cylinder block coaxially to the said valve responsive to the action of the fluid contained in said third chamber, and that the face of said piston which is responsive to the adjustment pressure is supplied with fluid through a rotary seal coaxial to said cylinder block.

4. Mechanism according to claim 3, characterized in that a resilient member is interposed between said piston and said valve for limiting the pressure in said third chamber independently of the adjustment pressure.

5. Mechanism according to claim 4, characterized in that the pipe line supplying fluid under pressure to said rotary seal and piston comprises a branch section supplying fluid to a throttling valve having a variable cross-sectional passage area.

6. Mechanism according to claim 5, characterized in that the fluid pressure downstream of said throttling valve is set by a pressure limiting device to a value sufficient to cause said cylinder-block pistons to be pressed against the aforesaid swash plate.

7. Mechanism according to claim 4, characterized in that the input members of said coupling are rigid with the crankshaft of an internal combustion engine of a vehicle, and that the output members are adapted to drive the primary shaft of a change-speed mechanism.

8. Mechanism according to claim 6, wherein a pump having a fluid output greater than that of the pump constituting the hydrostatic clutch is driven from a primary power source, said pump drawing oil from a reservoir and forcing same into a circuit comprising, in parallel, a safety valve for limiting the pressure in said pump, a port for supplying fluid under pressure to the piston provided for adjusting the fluid pressure in said coupling, and a throttling valve.

9. Mechanism according to claim 8, characterized in that a remote control device is provided for temporarily reducing to zero the gauged pressure of the pressure limiting device.

10. Mechanism according to claim 9, characterized in that the cross-sectional passage area of the throttling valve is controlled by the position of the accelerator pedal of the vehicle.

11. Mechanism according to claim 10, characterized in that the reduction to zero of the forced-feed pressure of the hydrostatic coupling is controlled by the change-speed control lever of the vehicle.

12. Mechanism according to claim 11, characterized in that said throttling valve is responsive to control means adapted to increase its cross-sectional passage area when the carburettor starter of the i.c. engine is actuated.

13. Mechanism according to claim 12, characterized in that an additional control of said throttling valve is responsive to the transmission speed in order to avoid untimely clutch disengagements during the operation of the vehicle.

14. Mechanism according to claim 6, characterized in that the pump provided for detecting the speed of the primary power source and supplying forced-feed fluid to said hydrostatic coupling is of the variable-capacity type self-adjustable at a pressure greater than the maximum pressure whereat the hydrostatic coupling fluid pressure adjustment piston should normally be actuated.

15. Mechanism according to claim 10, characterized in that the piston disposed in said third chamber and having one side responsive to the adjustment fluid pressure constitutes the member controlling the clamping of a friction clutch.

\* \* \* \* \*